United States Patent [19]
Park

[11] Patent Number: 6,077,583
[45] Date of Patent: Jun. 20, 2000

[54] DIGITAL INFORMATION GUARD

[76] Inventor: Arnold Park, 550 Webb Dr. #203, Mississauga, Canada, L5B 3Y4

[21] Appl. No.: 09/033,697

[22] Filed: Mar. 3, 1998

[51] Int. Cl.⁷ .................................................. B32B 3/00
[52] U.S. Cl. ...................... 428/64.1; 428/64.4; 428/64.7; 428/66.6; 428/412; 428/913; 369/283; 369/291
[58] Field of Search ................................ 428/64.1, 64.2, 428/64.4, 64.7, 66.6, 412, 913; 369/283, 291

[56] References Cited

U.S. PATENT DOCUMENTS

| | | | |
|---|---|---|---|
| 4,983,437 | 1/1991 | Merrick | 428/40 |
| 5,139,837 | 8/1992 | Kalyanaraman et al. | 428/64.1 |
| 5,787,069 | 7/1998 | Lowe et al. | 369/291 |

*Primary Examiner*—Elizabeth Evans

[57] ABSTRACT

A transparent protective cover for the play side of an optical disc is made of poly-carbon film. The protective cover is annular in shape and is appropriately sized to fit the various disc formats. There is provided an inner crevice or groove that fits the inner molding of a disc allowing for greater structural integrity and which assists in the placement of the protector on the disc. The device is attached to the disc using several clips that are located around the perimeter.

9 Claims, 1 Drawing Sheet

DIGITAL INFORMATION GUARD

FIELD OF THE INVENTION

The present invention relates to protective devices for optical discs containing data, music and the like. In particular the invention relates to the field of protection for the play side of a variety of optical discs, including standard audio CD's, Sega Saturn®, Sony Playstation®, Panasonic $3D_1$®, computer CD Roms and any other forms of "CD's", including larger "laser discs" and karaoke CDs.

BACKGROUND OF THE INVENTION

With the development of optical disc technology (compact discs, laser discs, DVD discs et.) their use has increased dramatically. Many different types of information are now stored on these types of discs which are used in the home, the workplace, in the automobile and with portable equipment.

The optical disc stores information digitally. The stored information is used by computers by reading tiny grooves and peaks as binary data. In audio CD players the Digital to Analog Converter (DAC) is used to turn the digital information to analog signals that can be heard as sound. Optical discs have two sides, the information side (generally the one with the label on it) and the read or play side (the shiny clear side). The preferred outer material in most of these discs is a poly-carbon. The poly-carbon encases the data layer and provides the shape and structural integrity for the disc. Due to the softness of poly-carbons however, surface damage is quite common. If the surface of an optical disc is scratched for example, the laser beam used to read the data is often reflected or misdirected resulting in mis-tracking or skipping.

The information side has a gloss coating that helps in protecting it, but the read side has no protection of any sort except for the jewel case, which only protects it during storage. Unfortunately most damages to the disc occurs during transition from the case to players or by mishandling. When a disc is damaged by scuffs or a scratch, the end result is loss of information. This translates to skipping and in some cases stopping of the disc playing device. In some audio CD players a technology called over-sampling is used to compensate for some information loss by filling in the missing data. This does help somewhat in allowing CDs to be still useable even with scuffs but it is very limited. In most cases over-sampling does not help in common types of scratches. This invention is designed to protect the CD by placing a protective cover on the read side where most of the damage occurs.

When being stored discs are typically placed in a rigid container (jewel case) which protects both the data side and the label side of the disc. When in use however the discs remain unprotected. Most of the damage occurs when discs are being transferred from storage to the reading/writing device.

Prior art devices do exist. Some require a centering adapter to ensure proper alignment. Others use adhesives, which can migrate off the surface or even to the disc which could damage the surface. Yet others are difficult to attach and remove.

A prior art device is disclosed in U.S. Pat. No. 4,983,437 entitled "Compact Disc Protector". This device only protects the information (top) side of the disc. The information side of the disc is generally more resilient to damage as compared to the unprotected play (bottom) side. The information side typically has a protective lacquer coating whereas the bottom side usually does not.

U.S. Pat. No. 4,879,710 entitled "Optical Disc Protector and Method for Applying Same" also discloses a protective device for optical discs. This device uses adhesive to attach the protector to the disc.

It would be desirable to have an easily attachable device that remains on the disc when in use and in storage. The protective device would have to permit normal functioning of the disc and would have to be capable of being securely attached. The ideal device would effectively be invisible to the user, providing added protection without any significant loss of convenience or utility.

The present invention overcomes problems associated with the prior art devices by providing protection to the read/play side of the disc and by allowing the end user to apply the device without the use of a special applying tool or adhesives. The use of adhesives may cause problems to the disc because of chemical reactions and also the migratory properties of adhesives. The end result is that the present invention will be easier to apply and will eliminate the use of any form of adhesives. Also because of the fact that it does not use adhesives, the present invention will be flexible and easier to replace if it incurs damage due to mishandling.

The prior art uses materials that were different from the CD itself. This could result in bubbling or the protective devices not fitting on to the CD properly due to thermal expansion or contraction. The present invention is designed to eliminate this problem by expanding or contracting at the same rate as the disc even at extreme temperature fluctuations. This ensures a precise fit for the protective device to the disc.

SUMMARY OF THE INVENTION

The present invention is designed to protect an optical disc by means of providing a secondary protective cover that does not interfere with the handling of the reading of the disc. It has been found that optical discs such as CD's, can be effectively played with a secondary layer attached to their surfaces as a protective cover. The cover of the present invention is easily applied by the user, in no way damages or alters the original integrity of the disc.

In accordance with the present invention there is provided an easily detachable protective cover for the play side of an optical disc. In the preferred embodiment the protector is made of poly-carbon film. The protector is annular in shape and is appropriately sized to fit the various disc formats. There is provided an inner crevice that fits the inner molding of a disc allowing for greater structural integrity and which assists in the placement of the protector on the disc. The device is attached to the disc using several clips that are located around the perimeter.

Further features of the invention will be described or will become apparent in the course of the following detailed description.

BRIEF DESCRIPTION OF THE DRAWINGS

The present invention is depicted and described in the accompanying drawings wherein like reference numerals refer to like parts in the several views, and wherein.

DETAILED DESCRIPTION OF THE PREFERRED EMBODIMENTS

Figure 1:
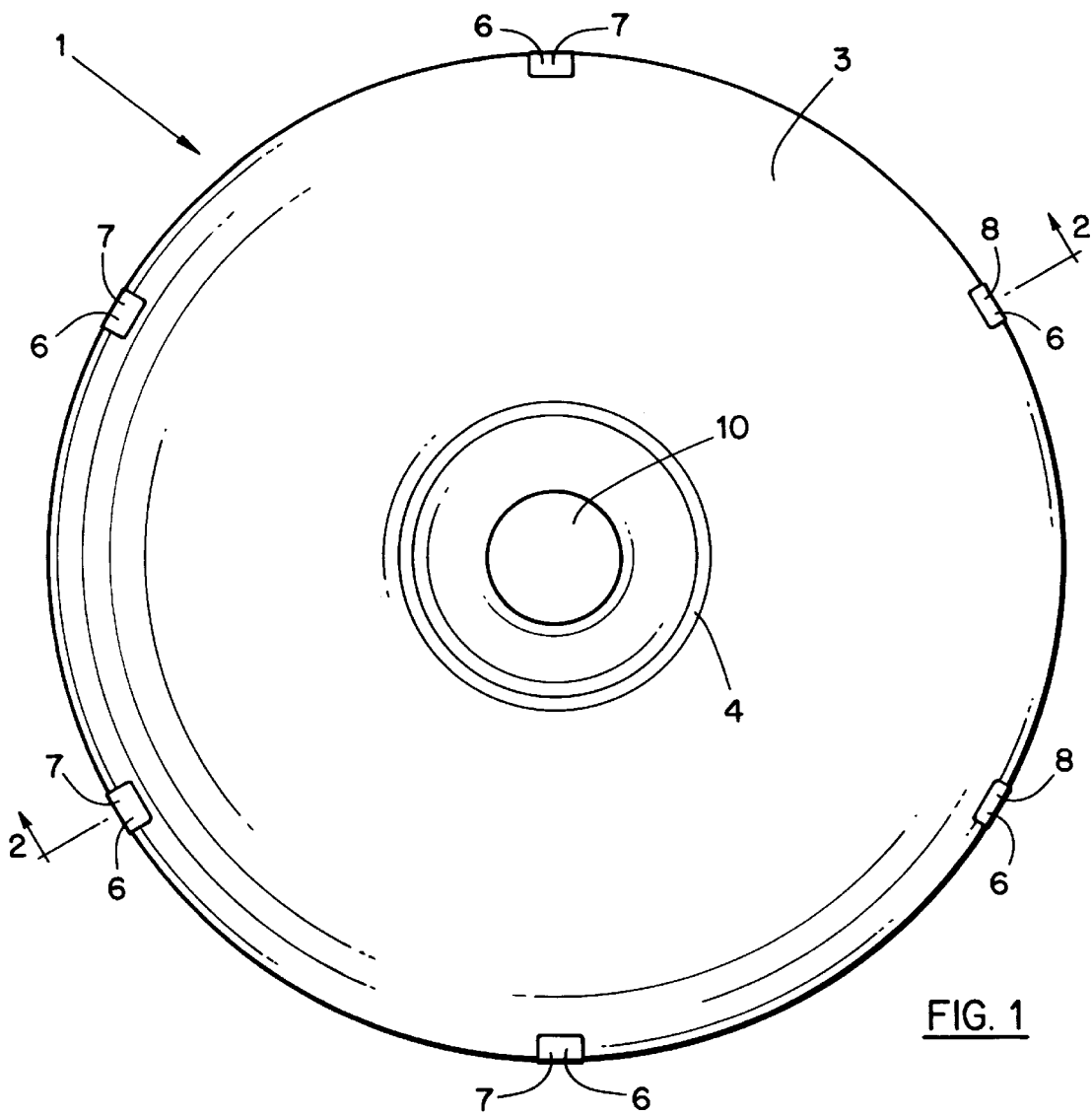
FIG. 1 is a top view of the protective cover of the present invention as installed around a disc.
Figure 2:
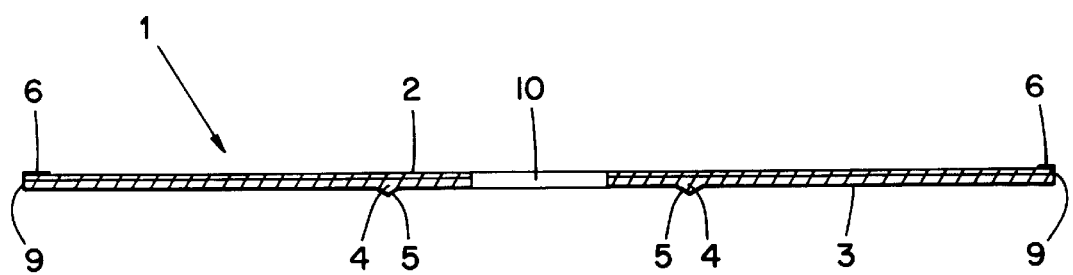
FIG. 2 is a side view showing the spaced relation of the protective cover and the disc.

With reference to FIGS. 1 and 2, a protective cover according to the present invention, generally indicated at 1, is applied to the play (read) side of an optical disc 2. The cover 1 is formed from a material that is transparent and allows the laser of a CD player to read all information from the disc. The cover 1 is intended to remain in place for the duration of the life of the protector which will vary depending on the use and environment in which it is used.

The cover 1 is made of poly-carbon (polycarbonate) film: the same material as the disc itself is made. Poly-carbon was chosen so there would be a consistent rate of contraction or expansion relative to the discs due to thermal variance in the environment. Poly-carbon was also chosen for this device because of its "memory" properties which allow it to retain its shape after it has been manufactured. The properties of the material should be as follows:

The temperature resistance level ideal should be so that the material does not lose any memory even at a high temperature. The polycarbon is able to retain such form and will not melt until 250 F. degrees.

Polycarbon also has a fairly stable moisture absorption level and at the same time thermal dimensional coefficient is low.

The polycarbon is fairly resistant to impact and holds the memory of a formed shape very well.

The most important characteristics of polycarbon is that it is very clear with very little distortion. This allows for the laser to pass through it and read the disc within the tolerance level so that information for it can be read.

The cover 1 of the present invention itself is shaped to fit a disc so that it will not slip or move once it is in place. The cover 1 consists of a generally flat transparent body portion 3 having substantially the same surface area as the disc 2. The thickness of the body portion 3 is preferably about 50 microns thick although this can be varied as long as the thickness does not exceed the tolerance level that will allow the disc player to read it.

The body portion 3 protects the read/play surface of the disc. This is the part of the cover that will eventually get damaged by handling.

The protective cover also has an inner crevice or groove that functions to provide structural integrity to hold its flat shape. This groove is formed by embossing or the like. It also assists in the placement of the protector over the disc by using the disc's nipple from the mold injection as a guide for the user to apply the protector and provide a more exact fit. In the embodiment shown the groove 4 is provided on the body portion 3 for higher structural integrity and at the same time hold the disc and the protective cover in place. This groove 4 is aligned with the grooves found on all discs. Ideally in the trough 5 of the groove 4 of the protective cover there is provided some material high in friction coefficient that is non-adhesive. The preferred material is found in most signs that stick to smooth surfaces like glass.

The groove 4 not only provides structural integrity by because of the grabbing effects of the material in the groove it provides a hold in the disc players.

Means is provided at the periphery of the cover to assist in retaining the cover in place. In the embodiment shown in FIGS. 1 and 2 a series of clips 6 are provided on the circumference of the protective cover 1. Each clip is shaped like a "C" and acts to hold the disc and protector together. One embodiment includes 6 to 20 flexible clips that are located around the perimeter of the disc. These clips can be cornered or rounded depending on the design. In the preferred embodiment shown six clips are provided with each of the clips 6, 60 degrees rad apart from each other. This is done so that the centrifugal force of the spinning disc will not throw of the protective device. Four of the clips 7 are larger than the last two 8. This is made this way so that a disc may be slid in to its proper position when the last two clips would snap on with little pressure. The four clips 7 have a rounded shape so the there is no sharp edges that may damage the disc. The two remaining clips 8 are also rounded but are shorter in length then the other four. The clips 6 hold the protective cover in place on the disc. The clips 6 are attached to the protective cover 1 by walls 9 which extend at 90 degree from the body portion 3 of the protective cover. The relative width of each wall ideally should be ⅕ of a centimeter, but this width can be changed as long as it do not form a sharp edge. The center 10 of the protective cover is cut out in the same diameter as the opening on the disc. The space between the cut center and the groove is used by the disc player to help hold the protector cover 1 in place with pressure during use.

It will be appreciated that the above description related to the preferred embodiment by way of example only. Many variations on the invention will be obvious to those knowledgeable in the field, and such obvious variations are within the scope of the invention as described and claimed whether or not expressly described.

The embodiments of the invention in which an exclusive property or privilege is claimed are defined as follows:

1. A protective cover for the play or read side of an optical disc said cover consisting of a generally flat transparent body portion substantially the same size as the optical disc, a circular groove formed in said body portion located to fit a corresponding inner molding on said disc thereby providing structural integrity to the protective cover and assisting in the placement of the protector on the disc and means provided at the periphery of said body portion to retain the protective cover on the disc wherein the protective cover is formed from a material that is transparent and allows a disc player to read all information from the disc.

2. A protective cover for the play or read side of an optical disc according to claim 1 wherein said means provided at the periphery of said body portion to retain the protective cover on the disc consist of a series of clips located around the periphery of the body portion.

3. A protective cover for the play or read side of an optical disc according to claim 1 wherein the protective cover is formed from a poly-carbon film.

4. A protective cover for the play or read side of an optical disc according to claim 3 wherein the poly-carbon film has a high temperature resistance level; has a stable moisture absorption level; has a low thermal dimensional coefficient; is resistant to impact and holds the memory of a formed shape well and is clear with very little distortion.

5. A protective cover for the play or read side of an optical disc according to claim 3 wherein the thickness of the body portion does not exceed the tolerance level that will allow the disc player to read the optical disc.

6. A protective cover for the play or read side of an optical disc according to claim 5 wherein the thickness of the body portion is about 50 microns.

7. A protective cover for the play or read side of an optical disc according to claim 2 wherein each clip is shaped like a "C" and acts to hold the disc and protector together.

8. A protective cover for the play or read side of an optical disc according to claim 7 wherein six clips are provided with each of the clips spaced equi-distant around the periphery of the body portion.

9. A protective cover for the play or read side of an optical disc according to claim 1 wherein the body portion interior of said circular groove is used by the disc player to help hold the protective cover in place with pressure during use.

* * * * *